(12) United States Patent
Grazulis (10) Patent No.: US 8,904,660 B2
(45) Date of Patent: Dec. 9, 2014

(54) STRAIGHTEDGE GUIDE

(71) Applicant: Antanas Grazulis, Chicago, IL (US)

(72) Inventor: Antanas Grazulis, Chicago, IL (US)

( * ) Notice: Subject to any disclaimer, the term of this patent is extended or adjusted under 35 U.S.C. 154(b) by 351 days.

(21) Appl. No.: 13/622,900

(22) Filed: Sep. 19, 2012

(65) Prior Publication Data

US 2013/0067757 A1 Mar. 21, 2013

Related U.S. Application Data

(60) Provisional application No. 61/536,233, filed on Sep. 19, 2011.

(51) Int. Cl.
*B43L 7/00* (2006.01)
*B23Q 9/00* (2006.01)

(52) U.S. Cl.
CPC ............ *B23Q 9/0014* (2013.01); *B23Q 9/0028* (2013.01)
USPC .............................................. 33/438; 33/640

(58) Field of Classification Search
USPC ........... 33/287, 438, 628, 630, 638, 640–642, 33/832, 430, 471, 42
See application file for complete search history.

(56) References Cited

U.S. PATENT DOCUMENTS

| | | | |
|---|---|---|---|
| 5,771,767 A * | 6/1998 | Itami | 33/459 |
| 6,256,899 B1 * | 7/2001 | McGhee | 33/640 |
| 6,557,601 B1 * | 5/2003 | Taylor | 33/497 |
| 6,901,680 B2 * | 6/2005 | Locaputo | 33/642 |
| 2013/0067757 A1 * | 3/2013 | Grazulis | 33/438 |

* cited by examiner

*Primary Examiner* — Yaritza Guadalupe_McCall (57) ABSTRACT

The present invention is a straightedge guide which is to accommodate a carpenter in performing accurate linear cuts. The present invention has a straightedge and a carriage, which rides along the rails of the straightedge. During operation, a cutting tool such as a circular saw is attached to plate of the carriage. Subsequently, the carriage and the attached circular saw are transported along the rails of the straightedge while the circular saw is cutting through the material beneath both the circular saw and the straightedge. The present invention is also useful in performing vertical straight cuts as the present invention has a vertical holder, which helps stabilize the straightedge upon a vertical flat surface. Attached to each rail of the straightedge is a ruler, which provides accurate measurements in woodcutting. Along with straight cuts, the present invention is also useful in performing circular cuts as the present invention is rotatable.

20 Claims, 10 Drawing Sheets

DETAIL A

FIG. 3

DETAIL B

SECTION C-C

STRAIGHTEDGE GUIDE

The current application claims a priority to the U.S. Provisional Patent application Ser. No. 61/536,233 filed on Sep. 19, 2011.

FIELD OF THE INVENTION

The present invention relates generally to a cutting tool used in performing accurate straight cuts in woodcutting. Specifically, the present invention is a straightedge guide with an attached carriage, whereupon a cutting tool is to be attached. Once attached, the cutting tool such as a circular saw, a jigsaw, or a router is slid up and down along the straightedge to help the carpenter in obtaining accurate linear cuts. Beside linear cuts, the present invention is also useful in obtaining circular cuts as the straightedge of the present invention can be rotatable around its center point.

BACKGROUND OF THE INVENTION

It is frequently difficult to correctly guide a circular saw or other powered cutting device along a straight line. Precision cuts are necessary to ensure the end product is cut according to specifications. There is therefore a need for a power tool that can be used in conjunction with a straightedge to allow for consistent straight cuts. The present invention is an accurate straightedge guide comprising a carriage, whereto a cutting power tool is to be attached. The present invention along with the attached cutting power tool serves as the necessary tools to the woodcutter in performing accurate straight cuts. The attached cutting power tool along with the carriage are transported linearly down the straightedge while the power tool is cutting through the material positioned beneath the straightedge. The present invention further serves as a means to allow the user to perform straight cuts on any flat surface as the straightedge can be removably attached or detached to any flat surface. Beside straight cuts, the present invention is also useful in performing circular cuts as the straightedge is rotatable around its center point.

DETAILED DESCRIPTION OF THE INVENTION

All illustrations of the drawings are for the purpose of describing selected versions of the present invention and are not intended to limit the scope of the present invention.

Figure 1:
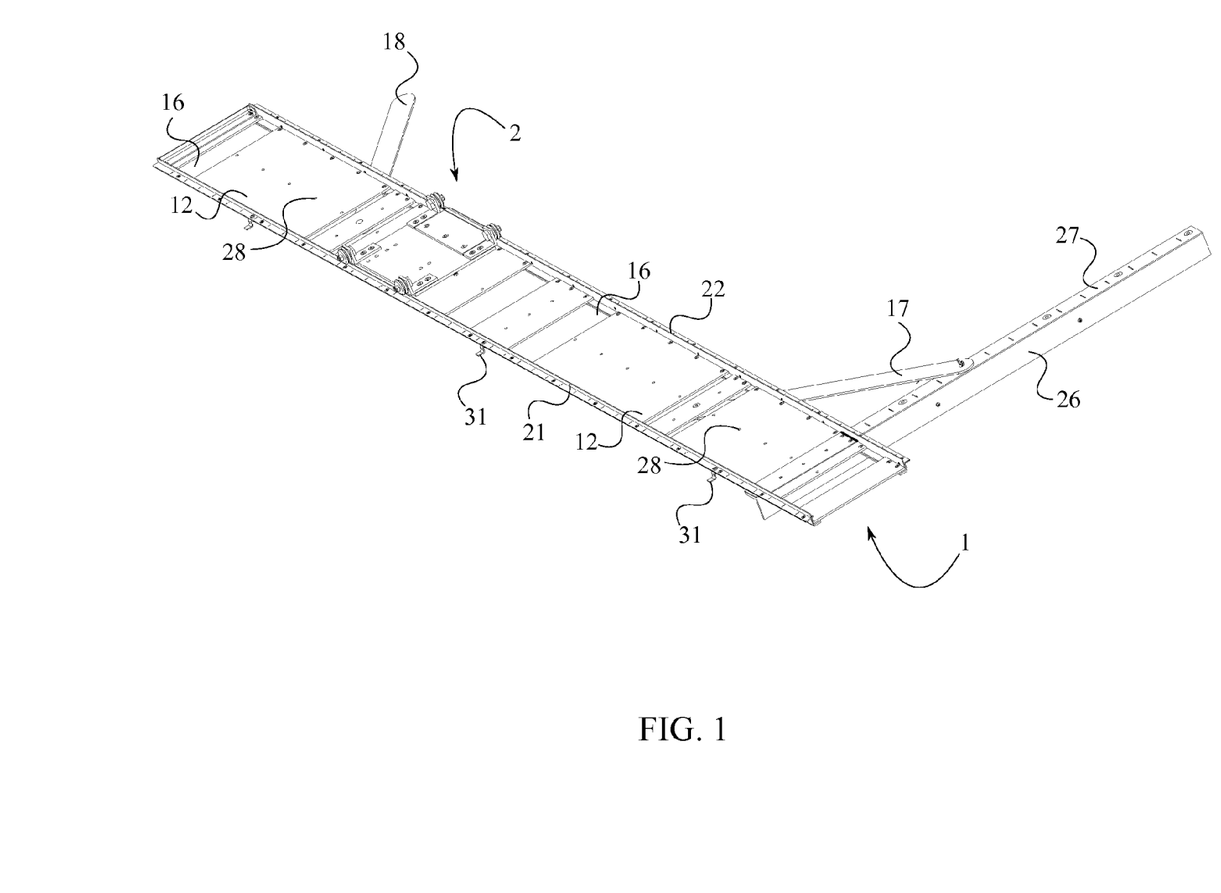
FIG. 1 is a top perspective view of the preferred embodiment of the present invention illustrating the carriage positioned atop the straightedge.
Figure 4:
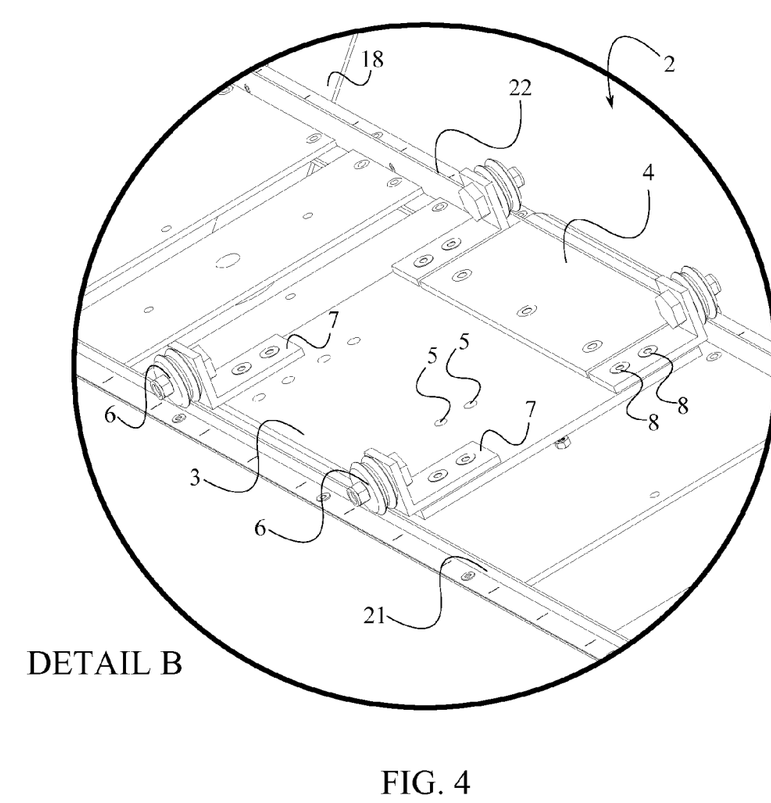
FIG. 4 is a detailed view of portion B.
Figure 5:
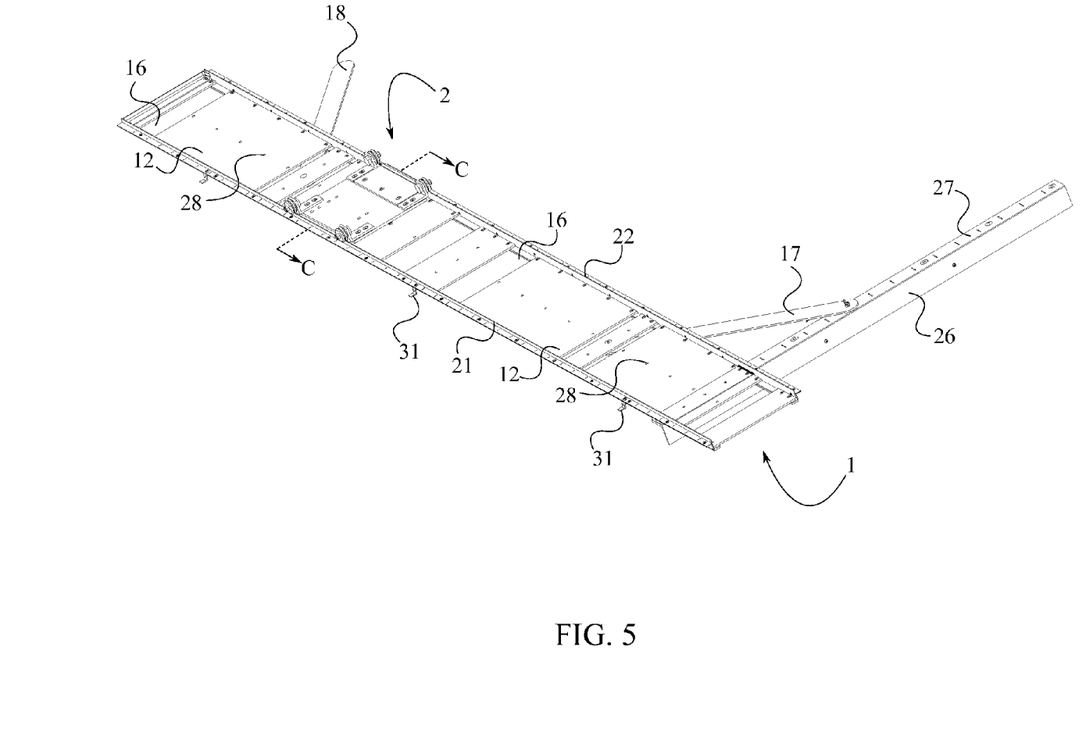
FIG. 5 is a top perspective view of the preferred embodiment of the present invention illustrating the plane upon which a cross-sectional view is taken and shown in FIG. 6.

The present invention is a straightedge guide which comprises a straightedge 1 and a carriage 2, which is to be positioned atop the straightedge 1 as shown in FIG. 1. The straightedge 1 comprises a pair of straightedge rails whereupon the carriage 2 rides as shown in FIG. 4. In the preferred embodiment, the overall length of the straightedge 1 is 96 inches; however, the length of the straightedge 1 can be increased by adding other sections of the straightedge 1 and securing them together by means of mechanical fasteners. The pair of straightedge rails comprises a first straightedge rail 21 and a second straightedge rail 22. In the preferred embodiment, both of the first straightedge rail 21 and the second straightedge rail 22 are made of aluminum angles. Moreover, the first straightedge rail 21 and the second straightedge rail 22 are positioned six inches apart. Along with the first straightedge rail 21 and the second straightedge rail 22, the straightedge 1 also comprises a plurality of sheets 12, a plurality of support panels 13, and a plurality of slots 16. At an end of the straightedge 1 is a stopper flange, which prevents the carriage from going off the first straightedge rail 21 and the second straightedge rail 22.

Figure 3:
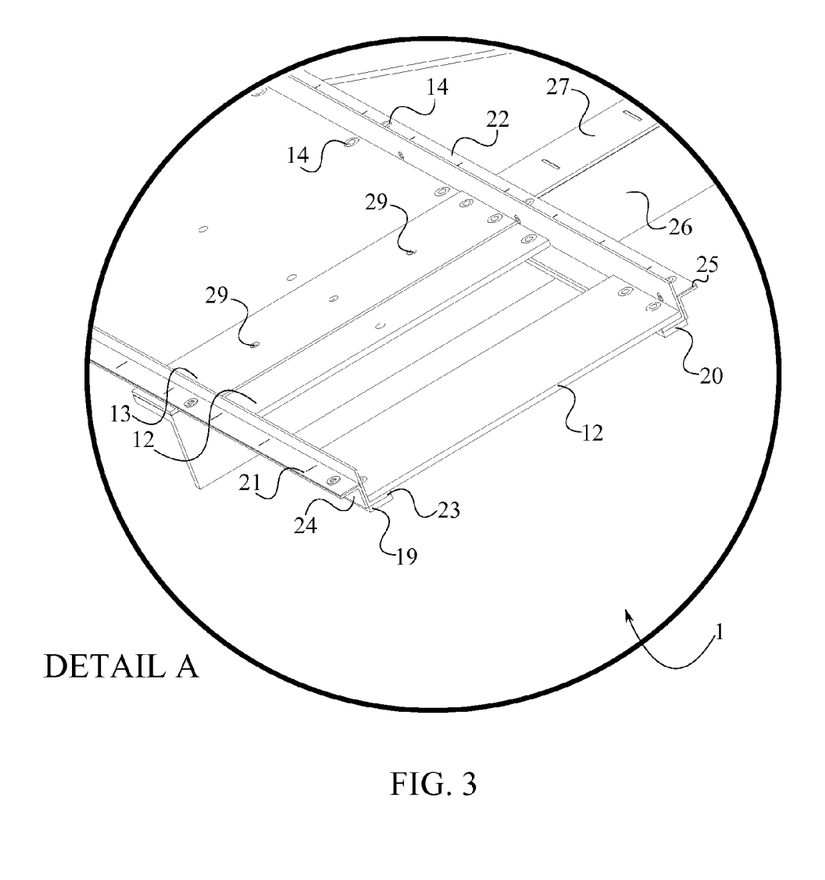
FIG. 3 is a detailed view of portion A.
Figure 10:
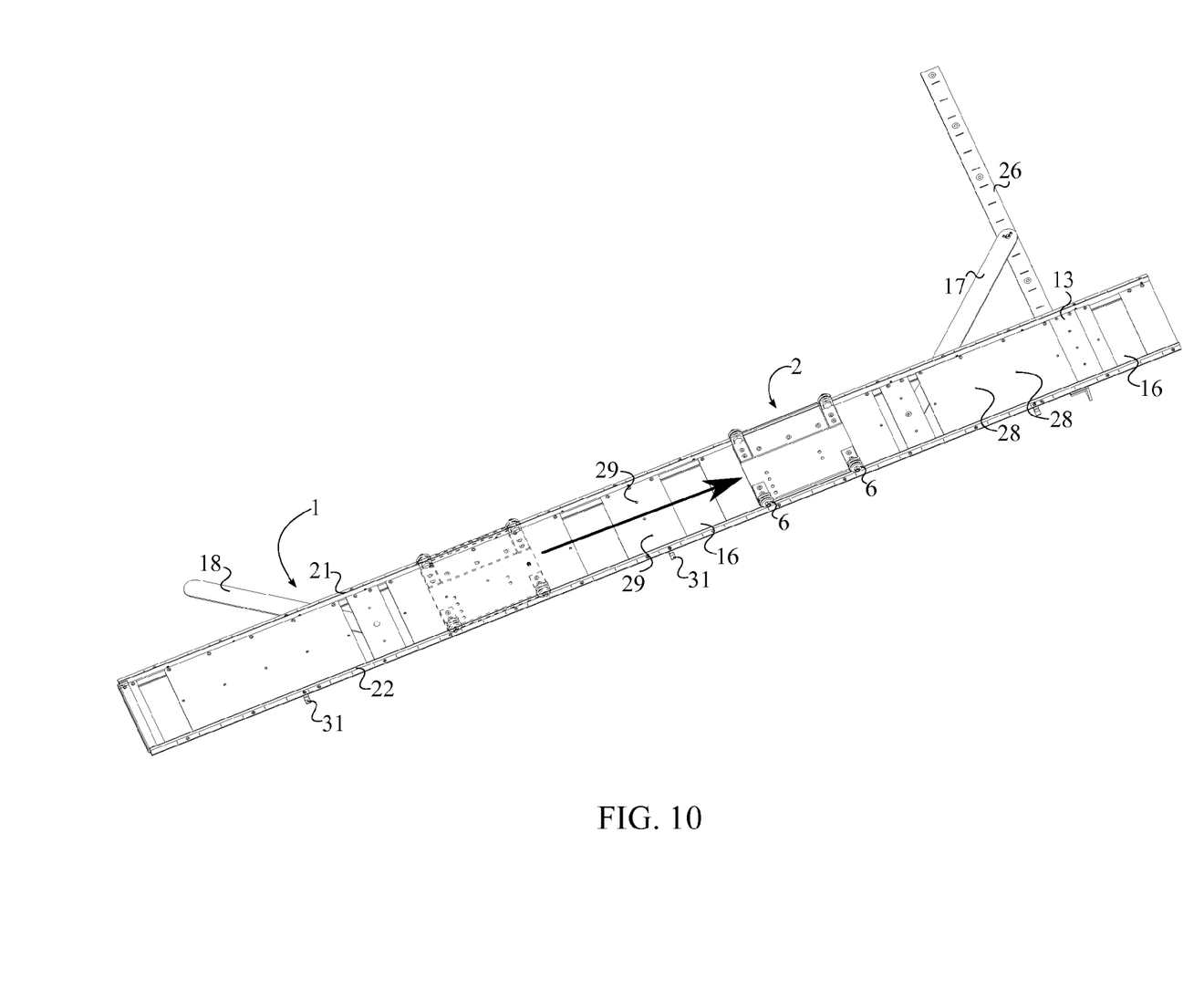
FIG. 10 is a functional view of the present invention illustrating the mobility of the carriage upon the straightedge.

Both of the first straightedge rail 21 and the second straightedge rail 22 form the longitudinal edges of the straightedge 1 and are held together by the plurality of sheets 12 and the plurality of support panels 13, which are heavy gauge and light gauge aluminum sheets. It is understood that both the straightedge 1 and the carriage 2 may be constructed from any suitable material of construction. As shown in FIG. 3, the first straightedge rail 21 and the second straightedge rail 22 each comprises a large right-angled rail 23, a small right-angled rail 24, and a straightedge ruler 25. Both of the large-right angled rail 23 and the small-right angled rail 24 are made of 1 inch angle with a thickness of ⅛ inches in the preferred embodiment. Both of the a large right-angled rail 23 and the small right-angled rail 24 are adjacently attached to each other via a plurality of straightedge holes 15 and a plurality of straightedge rivets 14. Moreover, the a large right-angled rail 23 allows the first straightedge rail 21 and the second straightedge rail 22 to be connected to the plurality of sheets 12, which serves as a base of the straightedge 1. Specifically, both the plurality of sheets 12 and the plurality of support panels 13 are positioned upon both the first straightedge rail 21 and the second straightedge rail 22. The base of the straightedge 1 serves to situate the first straightedge rail 21 and the second straightedge rail 22 at a distance so the carriage 2 would fit upon the first straightedge rail 21 and the second straightedge rail 22. The distance created by the plurality of sheets 12 and the plurality of support panels 13 between the first straightedge rail 21 and the second straightedge rail 22 also allows the carriage 2 to glide smoothly along the first straightedge rail 21 and the second straightedge rail 22 of the straightedge 1 as shown in FIG. 10.

The plurality of sheets 12 is positioned coplanarly and serially with each other, along the first straightedge rail 21 and the second straightedge rail 22 as shown in FIG. 1. Because the plurality of sheets 12 and the plurality of support panels 13 are wedged in between the first straightedge rail 21 and the seconds straightedge rail, the first straightedge rail 21 is positioned opposite to the second straightedge rail 22 along the plurality of sheets 12 and the plurality of support panels 13. Along with the plurality of sheets 12 are the plurality of slots 16 and the plurality of support panels 13. Each of the plurality of slots 16 is positioned between each of the plurality of sheets 12. Similar to the plurality of sheets 12, the plurality of slots 16 is positioned coplanarly and serially with each other along both the first straightedge rail 21 and the second straightedge rail 22. Similar to the plurality of sheets 12 and the plurality of slots 16, the plurality of support panels 13 is also coplanarly and serially positioned with each other along the first straightedge rail 21 and the second straightedge rail 22. The plurality of support panels 13 serves to stably reinforce the planar structure of the straightedge 1. Therefore, the plurality of support panels 13 is positioned atop the plurality of sheets 12. In the preferred embodiment, however, there is only one support panel. The plurality of support panels 13 is connected to the plurality of sheets 12 via the plurality of straightedge holes 15 and the a plurality of straightedge rivets 14.

In the preferred embodiment, the first straightedge rail 21 and the second straightedge rail 22 each comprises the a large right-angled rail 23 and the small right-angled rail 24. Both of the a large right-angled rail 23 and the small right-angled rail 24 are an L-shaped rail with a vertical plate positioned perpendicularly to a horizontal plate as shown in FIG. 3. To form the longitudinal edges of the straightedge 1, the horizontal plate of the a large right-angled rail 23 of both the first straightedge rail 21 and the second straightedge rail 22 is positioned coplanarly and beneath the plurality of sheets 12. Therefore, the plurality of sheets 12 is connected to the a large right-angled rail 23 via the horizontal plate. Specifically, the plurality of straightedge holes 15 and the a plurality of straightedge rivets 14 help connect the plurality of sheets 12 to the horizontal plate. Perforated along the horizontal plate of the a large right-angled rail 23 of both the first straightedge rail 21 and the second straightedge rail 22 is the plurality of straightedge holes 15. The plurality of straightedge holes 15 traverses through not only the horizontal plate, but also through the top and bottom edges of the plurality of sheets 12 and the plurality of support panels 13, and a plurality of non-slip panels. With the addition of the plurality of straightedge holes 15, the a plurality of straightedge rivets 14 are then incorporated as fasteners to attach the plurality of sheets 12, the plurality of support panels 13, and the plurality of non-slip panels to the horizontal plate of both the first straightedge rail 21 and the second straightedge rail 22. Moreover, the plurality of sheets 12 and the plurality of support panels 13 also comprise a plurality of center holes 28, which centrally traverses therethrough. The plurality of center holes 28 allows the straightedge 1 to be rotatable upon a flat surface with an attachment of a bolt to each of the plurality of center holes 28. Along with the plurality of center holes 28, there is a plurality of side holes 29 situated on both sides of the plurality of center holes 28. The plurality of side holes 29 serves as attachment points for a first short panel 17 and a second short panel 18 of the plurality of non-slip panels.

To form each of the longitudinal edges of the straightedge 1, the vertical plate of the a large right-angled rail 23 is attached to the vertical plate of the small right-angled rail 24, but the horizontal plate of the small right-angled rail 24 is positioned above the vertical plate of the small right-angled rail 24 as shown in FIG. 3. The vertical plate of the a large right-angled rail 23 serves as continuous rail whereupon the carriage 2 rolls. Attached upon the horizontal plate of the small right-angled rail 24 is the straightedge ruler 25 via the a plurality of straightedge rivets 14. The straightedge ruler 25 on both the first straightedge rail 21 and the second straightedge rail 22 of the straightedge 1 allows for accurate measurements during use. In the preferred embodiment, the straightedge ruler 25 is measuring tape. Also attached to the horizontal plate of small right-angled rail 24 is a plurality of cutting arrows 31, which serves to indicate distances and lines along the straightedge 1. Each of the plurality of cutting arrows 31 is attached to the horizontal plate by a bolt and a hexagon nut. As shown in FIG. 1, the side of the straightedge 1 with the plurality of cutting arrows 31 is the cutting side of the present invention. Moreover, the plurality of cutting arrows 31 may be painted in a vibrant color such as red for clearer indications and easier spotting. The plurality of rivets serve as fasteners to attach the a large right-angled rail 23 to the small right-angled rail 24 to form either the first straightedge rail 21 or the second straightedge rail 22. The traversal of the a plurality of straightedge rivets 14 through both the vertical plate of the a large right-angled rail 23 and the vertical plate of the small right-angled rail 24 is aided by the perforation of the plurality of straightedge holes 15 traversing therethrough. The horizontal plate of the small right-angled rail 24 serves as a platform rail whereupon the plurality of rollers 6 rolls.

The vertical plate of the a large right-angled rail 23 is attached to the vertical plate of the small right-angled rail 24 via the a plurality of straightedge rivets 14, but the position of the small right-angled rail 24 is inverted with respect to the a large right-angled rail 23. The horizontal plate of the a large right-angled rail 23 is facing inward the straightedge 1, whereas the horizontal plate of the small right-angled rail 24 is facing outward from the straightedge 1 as shown in FIG. 3. The horizontal plate of the small right-angled rail 24 is protruding from the midsection of the vertical plate of the a large right-angled rail 23. The horizontal plate of the small right-angled rail 24 forms a continuous horizontal rail that engages with the a curved flange 4 of the carriage 2. The engagement between the curved flange 4 and the horizontal plate of the small-right angled rail keeps the plurality of rollers 6 of the carriage 2 in firm contact with the first straightedge rail 21 and the second straightedge rail 22 of the straightedge 1. Further, the engagement prevents the carriage 2 and the attached cutting tool from falling off of the rails. Similarly, horizontal plate of the small right-angled rail 24 allows a plurality of bent strips 9 to engage firmly thereto. Each of the plurality of the bent strips is made of aluminum sheet and attached to the axle of each of the plurality of rollers 6. The plurality of bent strips 9 serves the same function as the curved flange 4.

Figure 6:
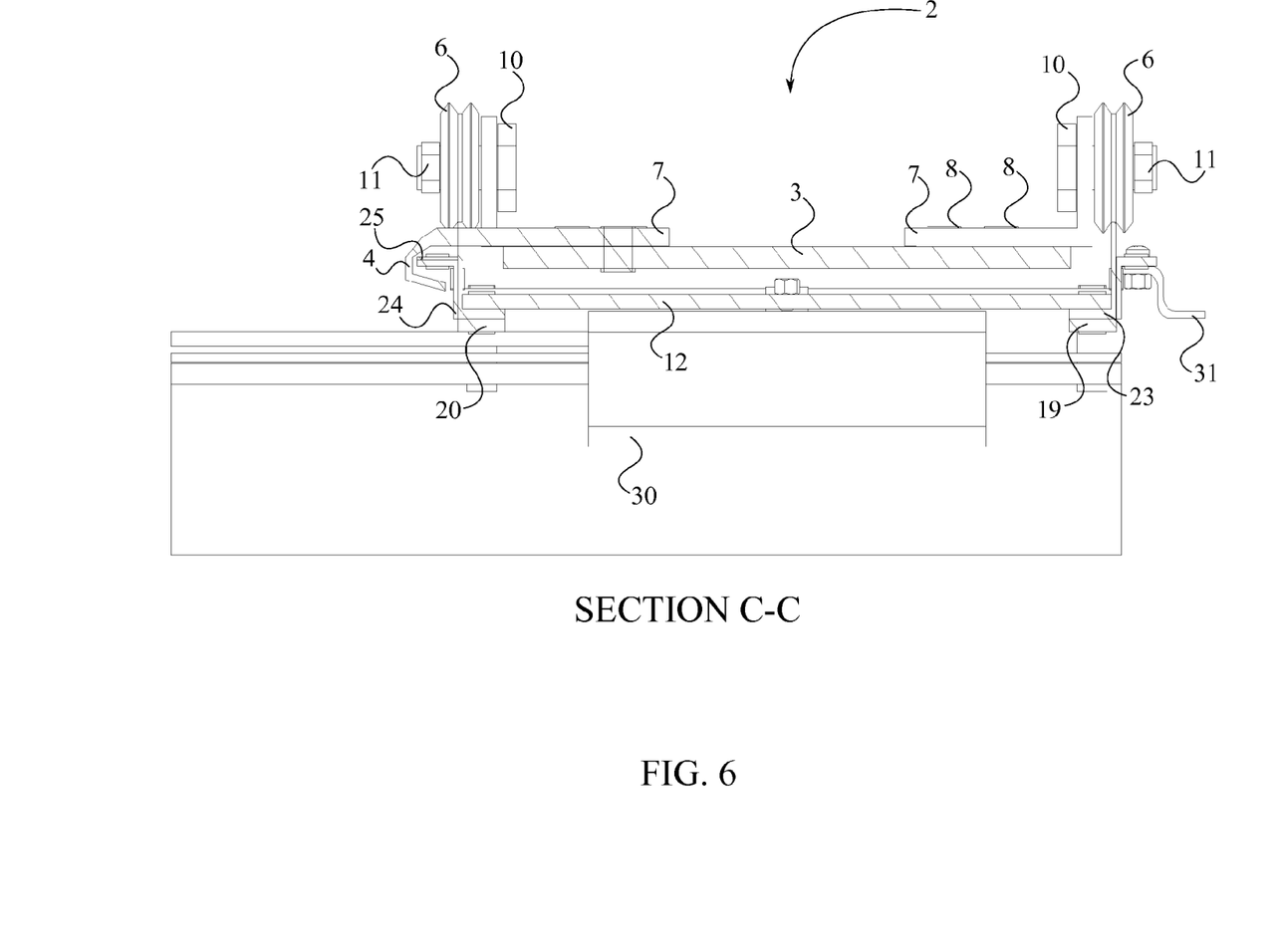
FIG. 6 is a cross-sectional view of the preferred embodiment of the present invention taken along line C-C of FIG. 5.
Figure 9:
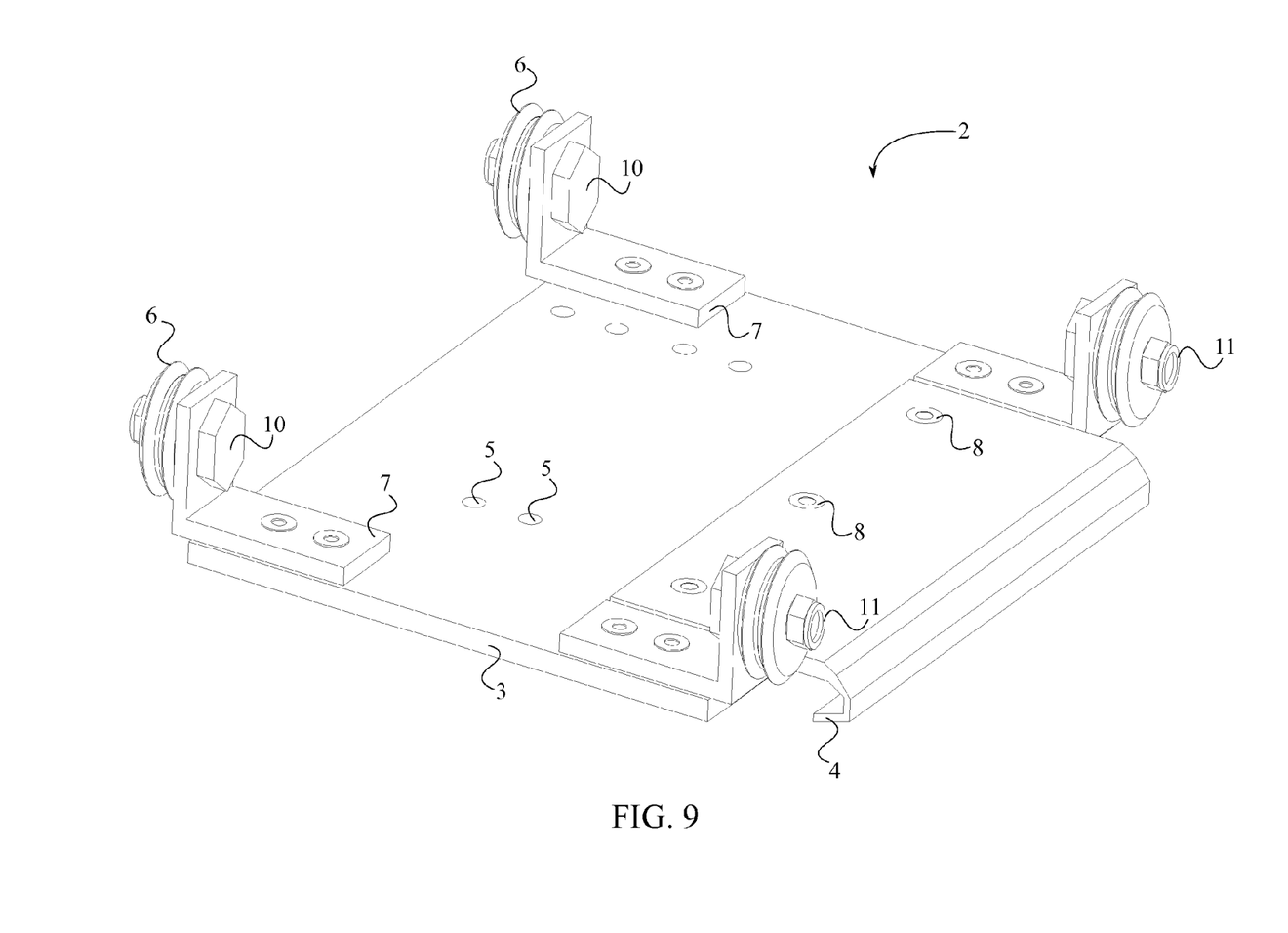
FIG. 9 is a detailed view of the carriage.

The carriage 2 of the present invention comprises a base plate 3, the curved flange 4, a plurality of rollers 6 and a plurality of L-shaped angles 7 as shown in FIG. 4, FIG. 6, and FIG. 9. In the preferred embodiment, the carriage 2 is universal and can be fastened to virtually any commercially available circular saw or cutting tool. Once attached to the carriage 2, the circular saw is located on the carriage 2 in a manner wherein the cutting blade is adjacent to one edge of the straightedge 1 when the carriage 2 is on the straightedge 1. The depth of the cut can be adjusted using the depth adjustment mechanism on the circular saw. The base plate 3 is a thick gauge metal sheet. In the preferred embodiment, the width of the base plate 3 is equivalent to the distance between the first straightedge rail 21 and the second straightedge rail 22. Particularly, the width of the base plate 3 is approximately six inches. Moreover, the carriage 2 of the preferred embodiment comprises four rollers. It is understood that the carriage 2 of the present invention may comprise more than four rollers as a larger carriage may require more rollers. The plurality of rollers 6 allows the carriage 2 to glide smoothly along the first straightedge rail 21 and the second straightedge rail 22 of the straightedge 1. Therefore, the plurality of rollers 6 is positioned upon both the first straightedge rail 21 and the second straightedge rail 22. Each of the plurality of rollers 6 is attached to each of the plurality of L-shaped angles 7 while each of the plurality of L-shaped angles 7 is stationarily attached to the base plate 3 via a plurality of carriage holes 5 and a plurality of carriage rivets 8. In the preferred embodiment, the plurality of L-shaped angles 7 is made of heavy gauge aluminum. Each of the plurality of L-shaped angles 7 is attached to the base plate 3 in a manner wherein the vertical plate of the L-shaped angle is perpendicularly positioned onto the base plate 3. Moreover, the vertical plate of the L-shaped angle is almost vertically flush with each of the edges of the base plate 3. The plurality of L-shaped angles 7 allows the plurality of rollers 6 to be attached to the base plate 3. Specifically, the vertical plate of the L-shaped angle allows each of the plurality of rollers 6 to be attached laterally thereto via each of a plurality of carriage bolts 10 and each of a plurality of hexagon nuts.

Each of the plurality of rollers 6 comprises an axle, an outer wheel, an inner wheel, and a groove. The groove is positioned in between the inner wheel and the outer wheel as shown in FIG. 6. The axle in the preferred embodiment is each of the plurality of carriage bolts 10. During use, the groove is positioned upon the vertical plate of the a large right-angled rail 23 whereas the outer wheel is positioned upon the horizontal plate of the small right-angled rail 24. In the preferred embodiment, each of the plurality of rollers 6 is a V-groove guide roller bearing whose diameter is approximately 1 and ¼ inches. The groove of the plurality of rollers 6 engages firmly with first straightedge rail 21 and the second straightedge rail 22 to prevent the carriage 2 and saw from moving side to side during transit. Specifically, RM2-2RS ⅜ inches V-groove guide bearings were used in the present invention. The bearings have a large diameter of 30.73 mm and a small diameter of 9.525 mm. The small diameter of the bearings is wherethrough each of the plurality of carriage bolts 10 traverses. The distance between the bottom of the groove to the center of the small diameter is approximately 12.7 mm. Since the V-groove is a 90 degree angle positioned with its vertex pointing toward the center of the large diameter and the small diameter, the lowest point of the V-groove is the bottom of the V-groove. Conversely, the highest or the farthest point of the V-groove, which is the lowest point of the V-groove reflected vertically along an imaginary horizontal plane, is 18.24 mm from the center of the small diameter or the center of the bearing. The width of the V-groove guide bearings is approximately 11.1 mm.

Each of the plurality of carriage bolts 10 traverses through the vertical plate of each of the plurality of L-shaped angles 7 and each of the plurality of rollers 6, leaving a portion of the bolt stem exposed. The exposed portion of the bolt stem is capped by each of a plurality of carriage hexagon nuts 11. Therefore, each of the plurality of carriage bolts 10 and each of the plurality of carriage hexagon nuts 11 keep each of the plurality of rollers 6 attached to each of the plurality of L-shaped angles 7. Each of the plurality of L-shaped angles 7 is situated at each corner of the base plate 3 with the vertical plate of each of the plurality of L-shaped angles 7 almost flush to each of the edges of the base plate 3. Specifically, each of the plurality of L-shaped angles 7 is positioned with the L facing inward, at each corner of the base plate 3. Along with the plurality of L-shaped angles 7, the base plate 3 is also attached to the curved flange 4. The curved flange 4 is essentially a flat metal sheet which curls inward like the letter J as shown in FIG. 6. During use, the curved portion of the curved flange 4 points downward and envelops the horizontal plate of the small-angled rail to provide stability to the carriage 2 during transit. The curved flange 4 is securely attached to the base plate 3 via the plurality of carriage rivets 8 and the plurality of carriage holes 5. The plurality of carriage rivets 8 traverse through the plurality of carriage holes 5, which is situated on both the base plate 3 and the curved flange 4. Thus, the plurality of rivets secure the curved flange 4 to the base plate 3. The base plate 3 comprises additional holes which traverse therethrough to allow the circular saw or the cutting tool to be attached thereto via a plurality of flat head screws. In the preferred embodiment, flat head screws with a tap drill size of 10-24×⅝ inches are used. Once the circular saw is attached to the base plate 3 of the carriage 2, the flat head screws are flush with the planar surface of the base plate 3, so there is adequate clearance between the carriage 2 and the straightedge 1. With adequate clearance, the carriage 2 will glide smoothly down the straightedge 1. With the circular saw properly mounted upon the carriage 2, the user is able to make clean and straight cuts through a cutting material beneath while using the present invention as a guide.

Figure 7:
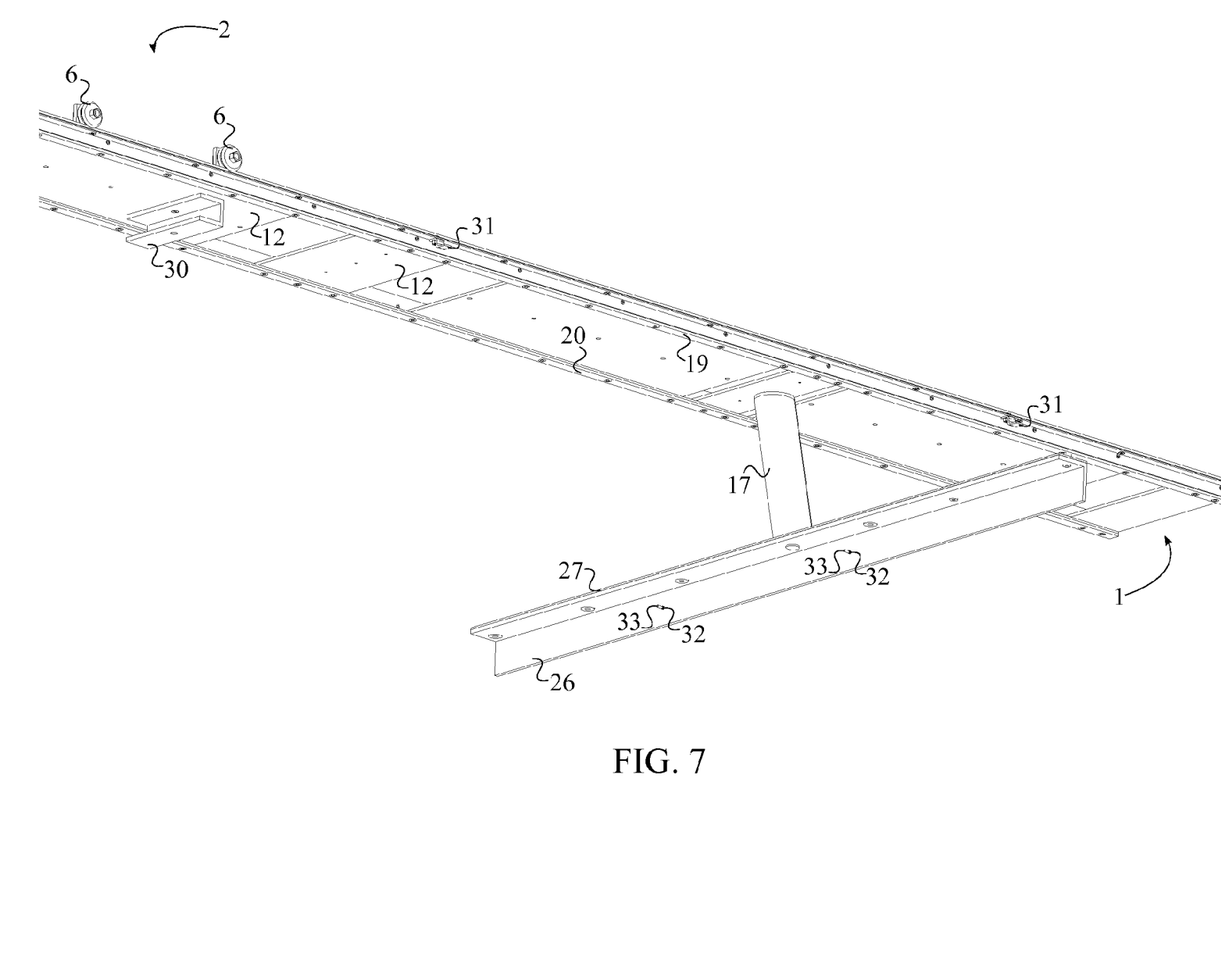
FIG. 7 is a perspective bottom view of the preferred embodiment of the present invention showing the components situated below the straightedge.

In order to keep the present invention stable and stationary during use, the present invention needs to be stabilized upon a flat surface such as that of a table. Therefore, the present invention comprises a plurality of non-slip panels adhered to the bottom of the straightedge 1. The plurality of non-slip panels comprises a non-slip layer made of abrasive material such as sandpaper or the like. The abrasiveness of the non-slip layer adds more friction to the bottom of the carriage 2 to prevent the carriage 2 from slipping off the planar surface of the table. The plurality of non-slip panels is made of the first short panel 17, the second short panel 18, a first long panel 19, and a second long panel 20. Both the first long panel 19 and the second long panel 20 are adhered to the longitudinal bottom edges of the straightedge 1 as shown in FIG. 1, FIG. 6, and FIG. 7. Therefore, both the first long panel 19 and the second long panel 20 are adhered parallelly and coplanarly upon the longitudinal bottom edges of the straightedge 1 via the a plurality of straightedge rivets 14 and the plurality of straightedge holes 15. As described previously, the plurality of straightedge holes 15 traverse through the plurality of sheets 12, the a large right-angled rail 23 of both the first straight edge rail and the second straightedge rail 22, and both the first long panel 19 and the second long panel 20. Due to the plurality of straightedge holes 15 traversing therethrough, both the first long panel 19 and the second long panel 20 can be adhered to the bottom of the straightedge 1 with the attachment of the a plurality of straightedge rivets 14. The a plurality of straightedge rivets 14 traverse through the first long panel 19, the second long panel 20, the a large right-angled rail 23, the plurality of sheets 12 and the plurality of support panels 13.

Figure 2:
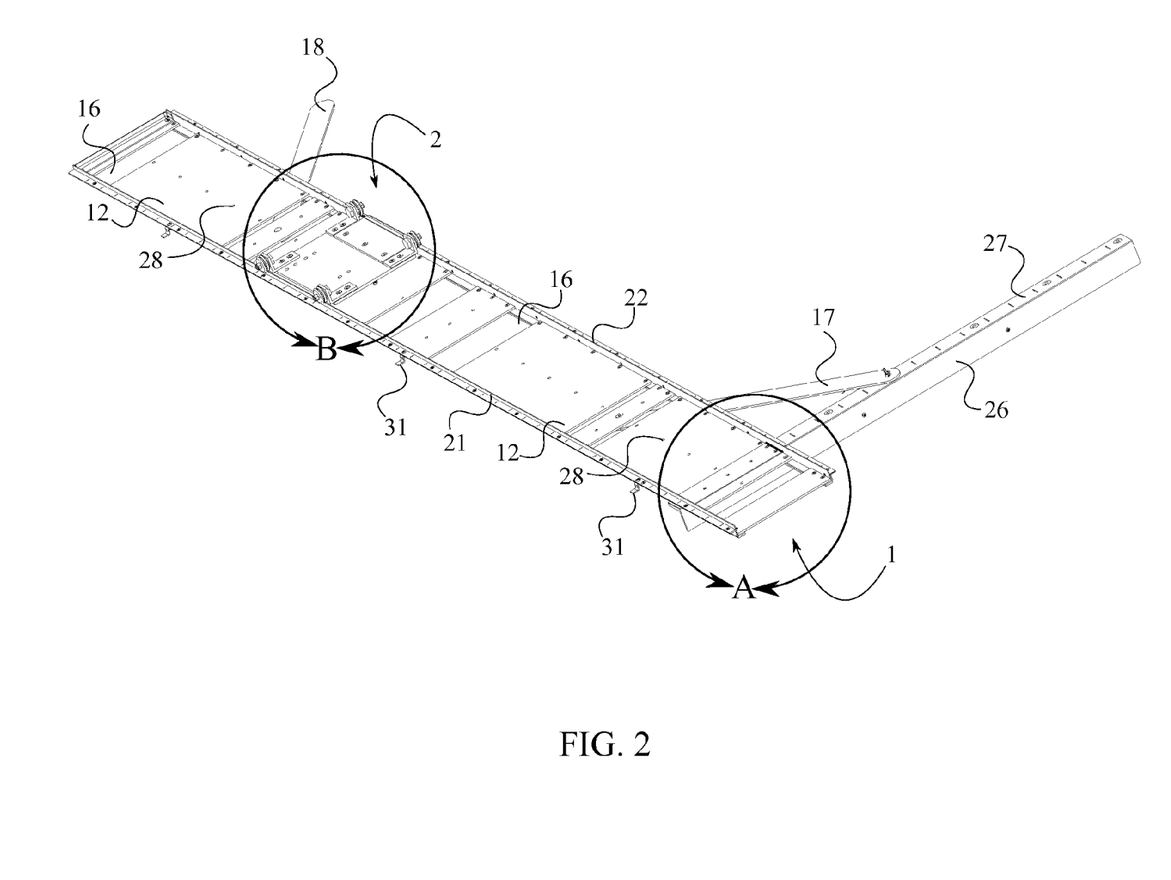
FIG. 2 is a top perspective view of the preferred embodiment of the present invention illustrating magnified portion A and magnified portion B.

Along with the first long panel 19 and the second long panel 20, the plurality of non-slip panels also includes the first short panel 17 and the second short panel 18, both of which are rotatably adhered to the bottom surface of the straightedge 1. The first short panel 17 and the second short panel 18 are composed of two layers adhered to each other. The first layer is metal sheet and the second layer is the non-slip layer. Therefore, as shown in FIG. 1 and FIG. 2, both the first short panel 17 and the second short panel 18 are attached to the bottom of the straightedge 1 via each of the a plurality of straightedge rivets 14. Specifically, the first short panel 17 and the second short panel 18 each is rotatably attached to each of the plurality of sheets 12. Both of the first short panel 17 and the second short panel 18 are approximately 1 and a half inches wide and 15 and a half inches long.

Connected to the free end of either the first short panel 17 or the second short panel 18 is a 90-degree support 26 as shown in FIG. 1. The 90-degree support 26 is a long 90-degree angle which is perpendicularly attached to the bottom of the straightedge 1 wherein the 90-degree angle of the 90-degree support 26 is attached to the bottom of the straightedge 1 like an up-side-down L with the vertical portion of the L is attached to the bottom of the straightedge 1 via the a plurality of straightedge rivets 14. Along the vertical portion of the 90-degree support 26 is a side ruler 27 which has been attached to the vertical portion thereof via a plurality of ruler rivets, which is situated collinearly with each other. In the preferred embodiment, the side ruler 27 is approximately 24 inches from the outermost edge of the 90-degree support 26 to the outermost edge of the straightedge 1. The plurality of ruler rivets are equally spaced along the side ruler 27 on the vertical portion of the 90-degree support 26. Along with the plurality of ruler rivets, there is a plurality of ruler bolts which allows the 90-degree support 26 to be attached to the bottom of the straightedge 1. Along with both the plurality of ruler rivets and the plurality of ruler bolts, there is a wingnut bolt located at midsection of the 90-degree support 26. In the preferred embodiment, wingnuts with the tap drill size of 10-24 inches were used. The wingnut bolt allows the free end of either the first short panel 17 or the second short panel 18 to be attached thereto. Once attached to the wingnut bolt, a wingnut can thus be attached thereto for securement. In the preferred embodiment, the wingnut bolt is located at approximately 15 inches from the outermost edge of the 90-degree support 26. The wingnut may also be located at the center or midsection of the 90-degree support 26. Once securely attached to the bottom of the straightedge 1, the user may use the 90-degree support 26 along with the side ruler 27 attached for accurate measurements and cuts since the 90-degree support 26 is always perpendicular to the straightedge 1. The 90-degree support 26 can be used in both horizontal and vertical cuttings. As shown in FIG. 7, traversing through the vertical plate of the 90-degree support 26 is a plurality of vertical cutting holes 32, which aids in fastening the apparatus to a vertical flat surface in vertical cuttings. Traversing through the plurality of vertical cutting holes 32 is a plurality of vertical cutting fasteners 33, which helps attach the vertical plate of the 90-degree support 26 to the vertical surface. Furthermore, the vertical cutting fasteners 33 can be used to clamp down the vertical plate of the 90-degree support 26 to the vertical surface.

The present invention can be used in both horizontal and vertical cuttings. For horizontal cuttings, the straightedge 1 guide is positioned on a flat surface such as that of a table. Subsequently, a cutting tool such as a circular saw is securely attached to the carriage 2 via the plurality of carriage holes 5 and the plurality of flat head screws. The straightedge 1 is securely attached to the table via the engagement of the first long panel 19 and the second long panel 20 to the surface of the table. The first short panel 17 and the second short panel 18 each can be securely adhered to the surface of the table with clamps. With clamps attached to the first short panel 17 and the second short panel 18 of the straightedge 1, the straightedge 1 is thus securely attached to the surface of the table. With a piece of wood beneath the straightedge 1, the user may cut the piece of wood by gliding down the circular saw and the carriage 2 down the straightedge 1 in a linear fashion. The present invention may be used in conjunction with other cutting tools such as jigsaws and routers. In using in conjunction with either a jigsaw or a router, the jigsaw or the router is positioned upon each of the plurality of slots 16 to allow the cutting tool to traverse perpendicularly therethrough. Once positioned onto each of the plurality of slots 16, the cutting tool can be rotated clock-wise or counter-clockwise in a 360-degree fashion provided the straightedge 1 is rotatably attached onto the surface via each of the plurality of center holes 28 and a bolt. Due to the position of the plurality of center holes 28, the straightedge 1 can be rotatable around each of the plurality of center holes 28. Therefore, circular cuts can also be achieved once the straightedge is pivoted around each of the plurality of center holes 28.

Figure 8:
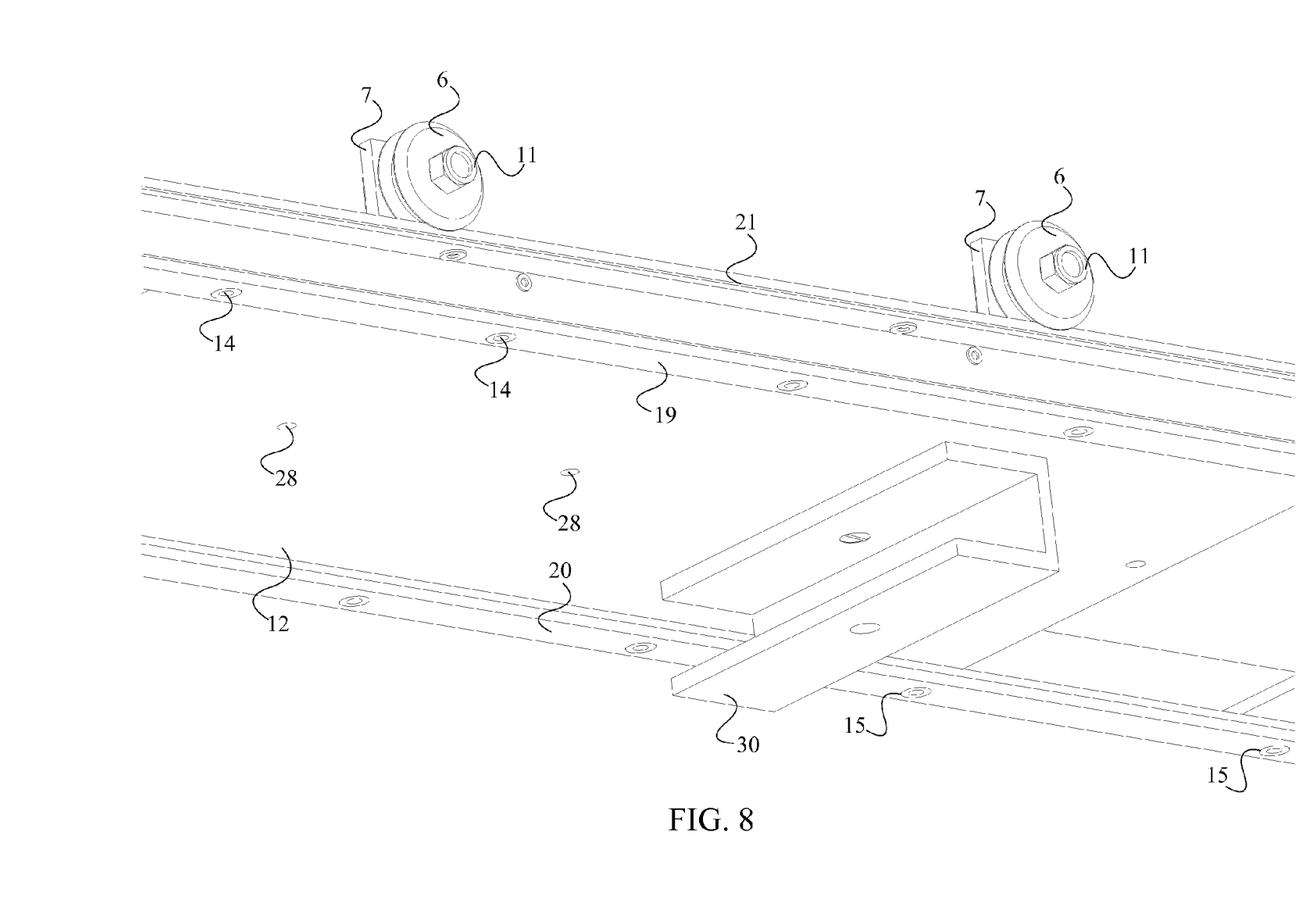
FIG. 8 is a detailed view of the vertical holder located below the straightedge.

In vertical cutting, the straightedge 1 of the present invention is attached to a vertical surface via a vertical holder 30. The vertical holder 30 is a U-shaped bar with a vertical holder hole centrally traversing through both vertical plates thereof. The hollow space within the U-shaped bar allows the vertical holder 30 to be hooked onto a flat vertical surface. As shown in FIG. 7 and FIG. 8, the vertical holder 30 is attached to the bottom of the straightedge 1 via a vertical holder bolt traversing through the vertical holder hole. The vertical holder bolt traverses through both vertical plates of the vertical holder 30 and through each of the plurality of sheets 12 below. Specifically, the vertical holder 30 is positioned slightly below each of the plurality of the slots as shown in FIG. 7. Once the straightedge 1 is hooked onto a vertical surface via the vertical holder 30, the user may clamp down the straightedge 1 thereupon via the first short panel 17 and the second short panel 18. During operation, the user may guide the cutting tool in either vertical directions along the straightedge 1 with the cutting tool attached to the carriage 2.

The straightedge 1 of the present invention possesses an alternative embodiment whose specifications are described hereinafter. Similar to the preferred embodiment of the straightedge 1, the alternative embodiment of the straightedge 1 also comprises the plurality of sheets 12, the first straightedge rail 21 and the second straightedge rail 22. Similar to the preferred embodiment, the first straightedge rail 21 and the second straightedge rail 22 are separated from each other by the plurality of sheets 12. Unlike the preferred embodiment, the first straightedge rail 21 and the second straightedge rail 22 each only comprises the a large right-angled rail 23. In the alternative embodiment, the a large right-angled rail 23 is solitary without reinforcement from the small right-angled rail 24. Therefore, during use, the carriage 2 will only be transported down the straightedge 1 along the vertical plate of the a large right-angled rail 23 of both the first straightedge rail 21 and the second straightedge rail 22 as shown in FIG. 10. Similar to the preferred embodiment, the plurality of sheets 12 is serially and coplanarly attached upon both the first straightedge rail 21 and the second straightedge rail 22 via the a plurality of straightedge rivets 14. The a plurality of straightedge rivets 14 traverse through the plurality of straightedge holes 15 which are serially positioned upon the horizontal plate of both the first straightedge rail 21 and the second straightedge rail 22. Specifically, the plurality of straightedge holes 15 traverses through the horizontal plate of both the first straightedge rail 21 and the second straightedge rail 22, and the top and bottom edges of each of the plurality of sheets 12. In addition to the plurality of sheets 12, the alternative embodiment of the straightedge 1 also comprises an extension plate. Similar to each of the plurality of sheets 12, the extension plate is also attached to the horizontal plate of both the first straightedge rail 21 and the second straightedge rail 22 via the a plurality of straightedge rivets 14. Unlike each of the plurality of sheets 12, the extension plate may not be completely riveted to both the first straightedge rail 21 and the second straightedge rail 22 due to the extension plate serving as an adjustable length to the straightedge 1. Particularly, the extension plate provides extra length to the alternative embodiment of the straightedge 1 for enhanced stability. As illustrated, the extension plate comprises extra extension plate holes which allow the extension plate to either be retracted into the straightedge 1 or extended therefrom. Thus, the length of the alternative embodiment of the straightedge 1 is adjustable due to the attachment of the extension plate.

In the preferred embodiment, the distance from the edge of the circular saw and to the curved flange 4 is approximately nine inches; the width of the base plate 3 after the circular saw is attached thereto is approximately five inches; the length of the carriage 2 is approximately thirteen inches; the width between each of the plurality of rollers 6 is approximately six and a half inches, but the cross-sectional distance between the grooves is six inches and $2/16$ inches; the width of the curved flange 4 is two and $3/4$ inches; the length of the curved flange 4 is 10 and a half inches; the distance between each of the plurality of carriage bolts along the length of the carriage 2 is approximately 11 and $3/4$ inches; the vertical length of each of the plurality of L-shaped angles 7 is $3/4$ inches; the cross-sectional distance between each of the plurality of L-shaped angles 7 is 2 and $1/2$ inches; and the distance from one of the base plate 3 to the tip end of the curved flange 4 along the width of the base plate 3 is six and $1/4$ inches.

Although the invention has been explained in relation to its preferred embodiment, it is to be understood that many other possible modifications and variations can be made without departing from the spirit and scope of the invention as hereinafter claimed.

What is claimed is:

1. A straightedge guide comprises,
a straightedge;
a carriage;
the straightedge comprises a plurality of sheets, a plurality of support panels, a plurality of slots, a first straightedge rail, and a second straightedge rail;
the carriage comprises a base plate, a curved flange, a plurality of rollers, and a plurality of L-shaped angles;
the first straightedge rail and the second straightedge rail each comprises a large right-angled rail, the small right-angled rail and a straightedge ruler;
the large right-angled rail and the small right-angled rail each comprises a horizontal plate and a vertical plate;
the plurality of sheets being positioned upon the first straightedge rail and the second straightedge;
the carriage being positioned atop the straightedge; and
the carriage being positioned upon the first straightedge rail and the second straightedge rail.

2. The straightedge guide as claimed in claim 1 comprises,
the plurality of sheets being positioned coplanarly with each other;
the plurality of sheets being positioned serially with each other;
the first straightedge rail being connected to the plurality of sheets via the large right-angled rail;
the second straightedge rail being connected to the plurality of sheets via the large right-angled rail; and
the first straightedge rail being positioned opposite to the second straightedge rail along the plurality of sheets.

3. The straightedge guide as claimed in claim 2 comprises,
the plurality of sheets being connected to the large right-angled rail via the horizontal plate; and
the plurality of sheets being connected to the horizontal plate via a plurality of straightedge holes and a plurality of straightedge rivets.

4. The straightedge guide as claimed in claim 1 comprises,
the base plate being connected to the curved flange via a plurality of carriage holes and a plurality of carriage holes;
the base plate being connected to the plurality of L-shaped angles via the plurality of carriage holes and the plurality of carriage rivets; and
the plurality of rollers being attached to the base plate via the plurality of L-shaped angles.

5. The straightedge guide as claimed in claim 1 comprises,
the horizontal plate being perpendicularly positioned with the vertical plate;
the large right-angled rail being adjacently attached to the small right-angled rail;
the large right-angled rail being adjacently attached to the small right-angled rail via the plurality of straightedge holes; and
the large right-angled rail being adjacently attached to the small right-angled rail via the plurality of straightedge rivets.

6. The straightedge guide as claimed in claim 5 comprises,
the vertical plate of the large right-angled rail being attached to the vertical plate of the small right-angled rail; and
the straightedge ruler being attached upon the horizontal plate of the small right-angled rail via the plurality of straightedge rivets.

7. The straightedge guide as claimed in claim 1 comprises,
the plurality of rollers being positioned upon the first straightedge rail; and
the plurality of rollers being positioned upon the second straightedge rail.

8. The straightedge guide as claimed in claim 7 comprises,
each of the plurality of rollers comprising an axle, an outer wheel, an inner wheel, and a groove;
the groove being positioned upon the vertical plate of the large right-angled rail; and
the outer wheel being positioned upon the horizontal plate of the small right-angled rail.

9. The straightedge guide as claimed in claim 1 comprises,
the plurality of sheets and the plurality of support panels comprising a plurality of center holes; and
the plurality of center holes being centrally positioned on the plurality of sheets and the plurality of support panels.

10. The straightedge guide as claimed in claim 1 comprises,
the plurality of slots being positioned between the plurality of sheets;
the plurality of slots being positioned along the first straightedge rail;
the plurality of slots being positioned along the second straightedge rail;
the plurality of slots being positioned coplanarly with each other; and
the plurality of slots being positioned serially with each other.

11. A straightedge guide comprises,
a straightedge;
a carriage;
the straightedge comprises a plurality of sheets, a plurality of support panels, a plurality of slots, a first straightedge rail, and a second straightedge rail;
the carriage comprises a base plate, a curved flange, a plurality of rollers, and a plurality of L-shaped angles;
the first straightedge rail and the second straightedge rail each comprises a large right-angled rail, the small right-angled rail and a straightedge ruler;
the large right-angled rail and the small right-angled rail each comprises a horizontal plate and a vertical plate;
the plurality of sheets being positioned upon the first straightedge rail and the second straightedge;
the carriage being positioned atop the straightedge;
the carriage being positioned upon the first straightedge rail and the second straightedge rail;
the plurality of sheets being positioned coplanarly with each other;

the plurality of sheets being positioned serially with each other;

the horizontal plate being perpendicularly positioned with the vertical plate;

the plurality of rollers being positioned upon the first straightedge rail;

the plurality of rollers being positioned upon the second straightedge rail;

the plurality of sheets and the plurality of support panels comprising a plurality of center holes; and the plurality of center holes being centrally positioned on the plurality of sheets and the plurality of support panels.

12. The straightedge guide as claimed in claim 11 comprises, the first straightedge rail being connected to the plurality of sheets via the large right-angled rail;

the second straightedge rail being connected to the plurality of sheets via the large right-angled rail;

the first straightedge rail being positioned opposite to the second straightedge rail along the plurality of sheets;

the plurality of sheets being connected to the large right-angled rail via the horizontal plate;

the plurality of sheets being connected to the horizontal plate via a plurality of straightedge holes and a plurality of straightedge rivets;

the large right-angled rail being adjacently attached to the small right-angled rail;

the large right-angled rail being adjacently attached to the small right-angled rail via the plurality of straightedge holes;

the large right-angled rail being adjacently attached to the small right-angled rail via the plurality of straightedge rivets; and the vertical plate of the large right-angled rail being attached to the vertical plate of the small right-angled rail; and the straightedge ruler being attached upon the horizontal plate of the small right-angled rail via the plurality of straightedge rivets.

13. The straightedge guide as claimed in claim 11 comprises, the base plate being connected to the curved flange via a plurality of carriage holes and a plurality of carriage holes;

the base plate being connected to the plurality of L-shaped angles via the plurality of carriage holes and the plurality of carriage rivets; and the plurality of rollers being attached to the base plate via the plurality of L-shaped angles.

14. The straightedge guide as claimed in claim 11 comprises, each of the plurality of rollers comprising an axle, an outer wheel, an inner wheel, and a groove;

the groove being positioned upon the vertical plate of the large right-angled rail; and the outer wheel being positioned upon the horizontal plate of the small right-angled rail.

15. The straightedge guide as claimed in claim 11 comprises, the plurality of slots being positioned between the plurality of sheets;

the plurality of slots being positioned along the first straightedge rail;

the plurality of slots being positioned along the second straightedge rail;

the plurality of slots being positioned coplanarly with each other; and the plurality of slots being positioned serially with each other.

16. A straightedge guide comprises, a straightedge;

a carriage;

the straightedge comprises a plurality of sheets, a plurality of support panels, a plurality of slots, a first straightedge rail, and a second straightedge rail;

the carriage comprises a base plate, a curved flange, a plurality of rollers, and a plurality of L-shaped angles;

the first straightedge rail and the second straightedge rail each comprises a large right-angled rail, the small right-angled rail and a straightedge ruler;

the large right-angled rail and the small right-angled rail each comprises a horizontal plate and a vertical plate;

the plurality of sheets being positioned upon the first straightedge rail and the second straightedge;

the carriage being positioned atop the straightedge;

the carriage being positioned upon the first straightedge rail and the second straightedge rail;

the plurality of sheets being positioned coplanarly with each other;

the plurality of sheets being positioned serially with each other;

the first straightedge rail being connected to the plurality of sheets via the large right-angled rail;

the second straightedge rail being connected to the plurality of sheets via the large right-angled rail;

the first straightedge rail being positioned opposite to the second straightedge rail along the plurality of sheets;

the horizontal plate being perpendicularly positioned with the vertical plate;

the plurality of rollers being positioned upon the first straightedge rail;

the plurality of rollers being positioned upon the second straightedge rail; and each of the plurality of rollers comprising an axle, an outer wheel, an inner wheel, and a groove.

17. The straightedge guide as claimed in claim 16 comprises, the plurality of sheets being connected to the large right-angled rail via the horizontal plate;

the plurality of sheets being connected to the horizontal plate via a plurality of straightedge holes and a plurality of straightedge rivets;

the large right-angled rail being adjacently attached to the small right-angled rail;

the large right-angled rail being adjacently attached to the small right-angled rail via the plurality of straightedge holes;

the large right-angled rail being adjacently attached to the small right-angled rail via the plurality of straightedge rivets; and the vertical plate of the large right-angled rail is being attached to the vertical plate of the small right-angled rail;

the vertical plate of the large right-angled rail being attached to the vertical plate of the small right-angled rail; and the straightedge ruler being attached upon the horizontal plate of the small right-angled rail via the plurality of straightedge rivets.

18. The straightedge guide as claimed in claim 16 comprises, the base plate being connected to the curved flange via a plurality of carriage holes and a plurality of carriage holes;

the base plate being connected to the plurality of L-shaped angles via the plurality of carriage holes and the plurality of carriage rivets; and the plurality of rollers being attached to the base plate via the plurality of L-shaped angles.

19. The straightedge guide as claimed in claim 16 comprises, the groove being positioned upon the vertical plate of the large right-angled rail; and the outer wheel being positioned upon the horizontal plate of the small right-angled rail.

20. The straightedge guide as claimed in claim 16 comprises, the plurality of slots being positioned between the plurality of sheets;

the plurality of slots being positioned along the first straightedge rail;

the plurality of slots being positioned along the second straightedge rail;

the plurality of slots being positioned coplanarly with each other; and the plurality of slots being positioned serially with each other.

\* \* \* \* \*